United States Patent Office 3,521,507
Patented July 21, 1970

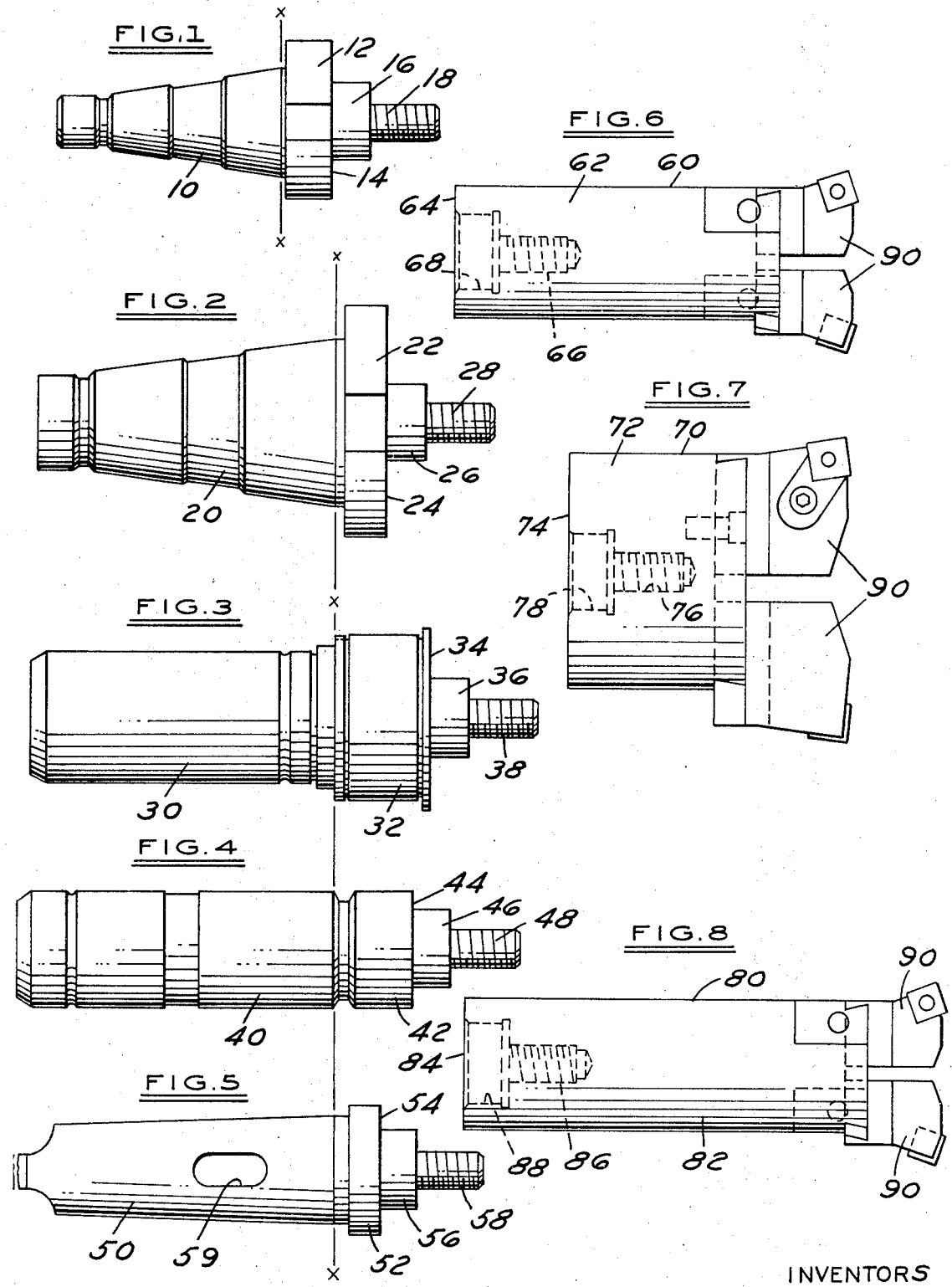

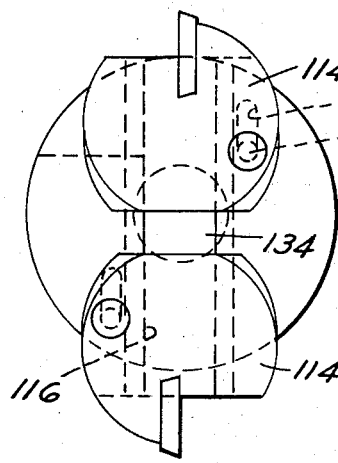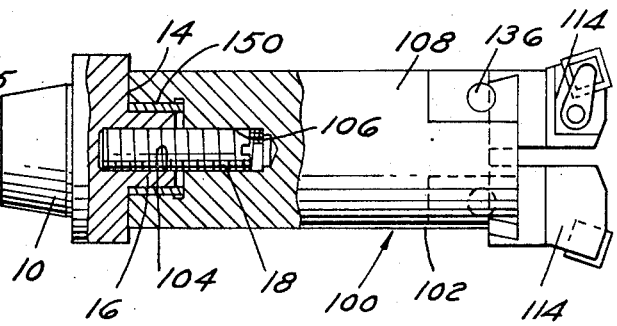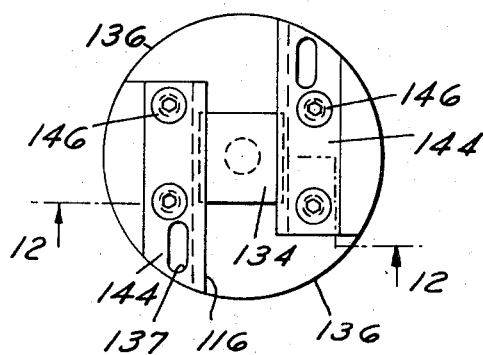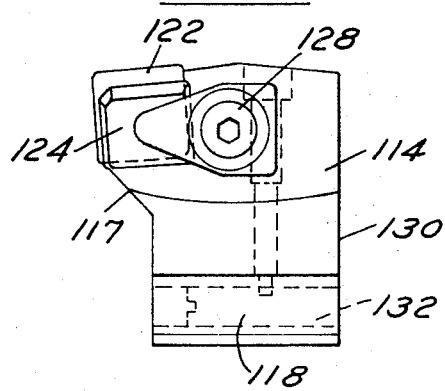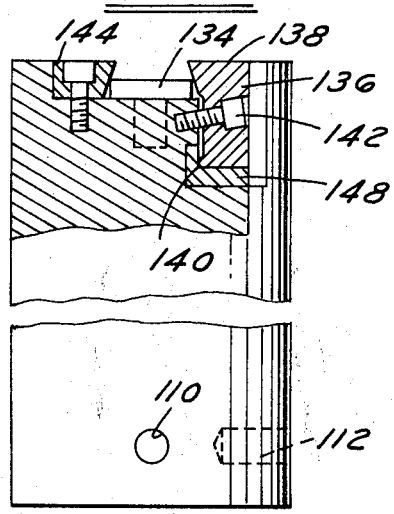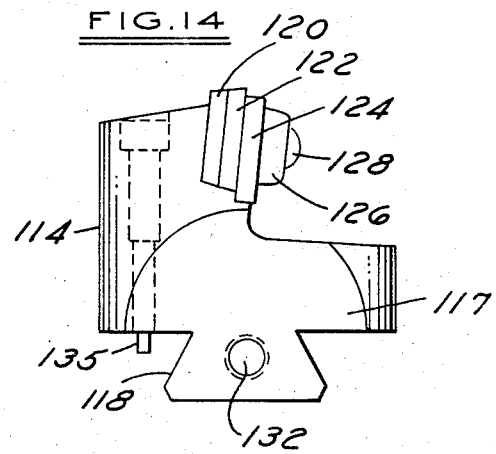

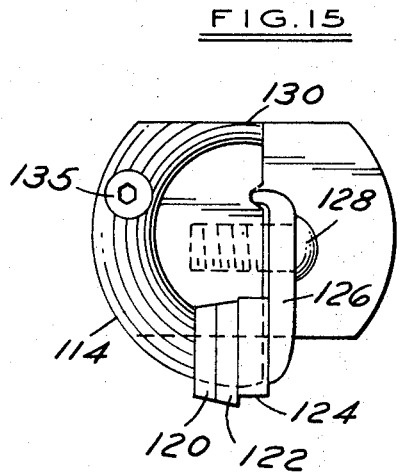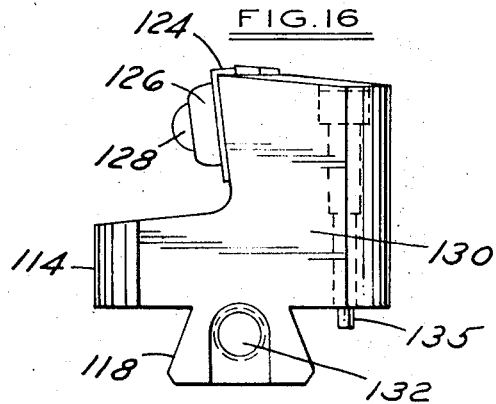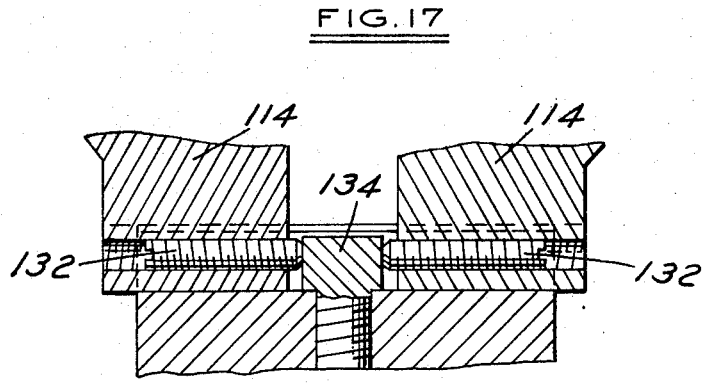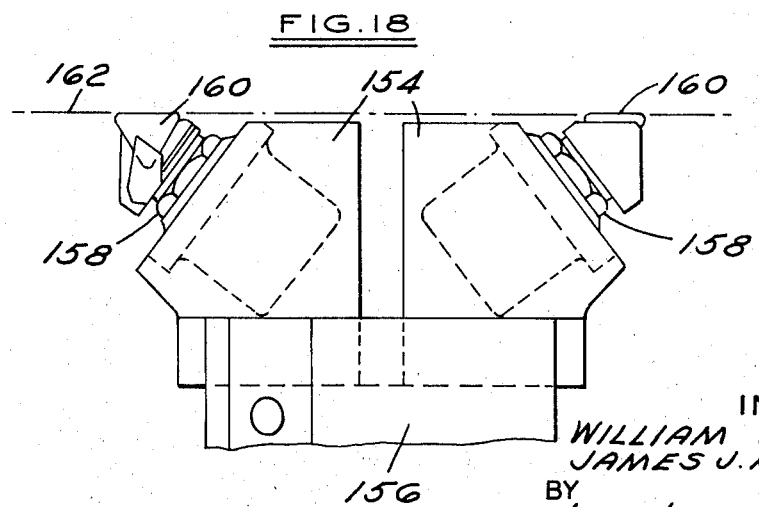

1

3,521,507
ADAPTER SHANK AND TWIN-SET SYSTEM
William Yogus, Birmingham, and James J. Robinson, Southfield, Mich., assignors to The Valeron Corporation, a corporation of Michigan
Filed Oct. 11, 1967, Ser. No. 674,460
Int. Cl. B23b 29/02
U.S. Cl. 77—58                                8 Claims

ABSTRACT OF THE DISCLOSURE

A tooling system for interchangeable use of cutting tools between different makes of machine tools and including a set of shanks, a plurality of cutting tools with spacer bars, means of axially aligned interengagement therebetween, such as tensionable threaded fastener means, and with twin-set cutting tools on the ends of the spacer bars for balanced cutting and counterbalancing use in obtaining faster tool cutting speeds.

BACKGROUND OF THE INVENTION

Machine tool users and manufacturers are becoming increasingly concerned about the growing cost of cutting tools to provide complete tooling packages for the many different makes of machines which are available; particularly with the trend toward numerical control systems where there are added costs for tool storage and retrieval.

Many machine tool manufacturers have adopted some form of multiple piece tooling to provide greater versatility at lower cost in their tooling packages. However, there are no tooling systems which provide any appreciable amount of interchangeability between the tooling for different machines.

Certain milling machines use milling cutters that are attached directly to a shank member by bolt fasteners through their end faces and which are adaptable for use with the shanks of other makes of machines, with some slight modification. However, boring bars and other cutting tools are often too small in diameter, long in length, and without adequate flanged surfaces to make use of such bolt fastening means for attachment to such shanks.

There are adapters for some of these smaller sized cutting tools but their use is more specialized than general since the adapters are limited to use essentially only one make of machine tool and they are receptive of only a limited number of tools with a particular shank design. Most such adapters include a shank with a socket hole for the tool holder shank, which limits the adapters use to tools with shanks smaller than their own, and they have a tool holding collet or other means at their outer ends which extends the tool length and makes them impractical for use with tools having high cutting speeds or with multiple piece tooling where tool length and rigidity is important to minimize problems of vibration and chatter.

SUMMARY OF THE INVENTION

The present invention relates to cutting tools in general and more particularly to a tooling system which enables realtively unlimited interchangeable use of different cutting tools with the most widely used makes of cutting tool machines.

The proposed tooling system includes a set of shanks, each for a particular make of machine, and a tooling package which includes cutting tools without shanks, as commonly known, and which are adapted for interengagement with each and any selected one of the shanks in the set. Each of the shanks includes a square shouldered end, closely related to the gauge line of the machines for

2 which intended, with a like pilot projection and threaded stud extending therebeyond. The tooling includes spacer bars with squared ends, and like pilot bores and threaded operations, receptive of the pilot projections and threaded studs of any one of the shanks; whereby an internal axially aligned and operative means of tensionable interengagement is provided between selected tooling and shanks in whatever combinations are desired.

The solid mass shanks have better bearing support in the machine tool spindles and their relatively short length places the junction for the interchangeable tooling as close to the spindle bearings as possible to provide an overall tooling length essentially the same as for one piece tooling and to minimize problems of vibration and chatter inherent in most multiple piece tooling and with unbalanced tooling of any appreciable length when operated at high cutting speeds.

The means of internal threaded engagement between the shanks and spacer bars, and which provided the axial tensioning and square shoulder butted engagement between the ends thereof, is small enough in cross-sectional size for the necessary wall thickness strength in the smallest sized shanks and spacer bars and is long enough for the tensioning strength needed in the largest sized combinations. In addition, the mating ends of the shanks and bars are dished slightly to assure the broadest peripheral and radially inward tensioned engagement therebetween.

To further assure against imbalance in the cutting tools and to enable maximum cutting speeds, twin tool heads are used on the spacer bars and are made radially adjustable either individually or together for balanced cutting or counterbalancing use as proves most beneficial in different instances.

The adapter shanks are preferably drilled and tapped to receive the threaded stud, so that the stud may be replaced, if damaged, and the mating ends of the shanks and bars may be refaced at any time it becomes necessary.

These and other objects and advantages will be discussed in further detail in the description which follows a brief reference to the accompanying drawings.

DESCRIPTION OF DRAWINGS

FIGS. 1–5 are side plan views of different shank members used in the practice of this invention and showing the threaded studs used for the axial tensioning interengaging means of retaining the spacer bars of tool members thereto.

FIGS. 6–8 are side plan views of different tool members for engagement with the tool shanks shown in the previous drawing figures.

FIG. 9 is an end view of one of the tool members showing the twin tool heads used.

FIG. 10 is a side plan view of a tool and shank, as assembled for use, with the junction shown in cross-section to better illustrate the means of interengagement therebetween.

FIG. 11 is an enlarged end view of the spacer bar, without the tool heads.

FIG. 12 is a cross-sectional view of the spacer bar shown in the previous drawing figure as seen in the plane of line 12—12.

FIG. 13 is a side elevational view of one of the tool heads or holder cartridges.

FIGS. 14–16 are respectively front, top and back plan views of the tool holder cartridge of FIG. 13.

FIG. 17 is an enlarged and fragmentary cross-sectional view of the tool holder cartridges in a spacer bar, showing their means of radial adjustment.

FIG. 18 is a side elevation of another set of tool cartridges for use in the twin-set system disclosed.

DETAILED DESCRIPTION

In the practice of this invention, a group of tool shanks for use in the most widely used machine tools are adapted for use as a set of adapter shanks with each formed to include a transverse end wall face, terminating as close to their gauge line as is practical, and with a like threaded male stud extending from each end wall face.

The "40" N.M.T.B. taper spindle shank 10 shown in the first drawing figure has a small flanged head 12, just forward of its gauge line x—x, and a transverse end wall face 14, with a pilot projection 16, and a threaded male stud 18 projecting therefrom. The "50" N.M.T.B. taper shank 20 of the second drawing figure has a like flanged head 22, forward of its gage line x—x, a transverse end wall 24, with a pilot projection 26, and a threaded stud 28 projecting therefrom. The other makes of machine tool shanks 30, 40 and 50, shown respectively in FIGS. 3–5, include flanged heads 32, 42 and 52, end wall faces 34, 44 and 54, with cylindrical pilot projections 36, 46 and 56, and threaded male studs 38, 48 and 58.

The tool shanks 30 and 40 will be recognized as for numerical control machines and as having wider flanged heads 32 and 42 for selector or code rings. However, they are generally similar to the other tool shanks in having the terminal end wall face as close to their gauge lines as is practical.

The pilot projections provide accurately ground surfaces for true axial alignment and may engage a corresponding female surface in the spacer bar; or an insert ring 150 shown in the shank for use with tool holders of aluminum or other softer metals as shown in FIG. 10.

The first two shanks 10 and 20 will be appreciated as held in the end of a machine tool spindle by a draw bar (not shown) to provide bearing engagement along their tapered length and particularly near their gauge lines x—x, while the shanks 30 and 40 are held by collet arrangements incident to the spindles in the machines for which they are designed and the shank 50 is normally held to its spindle by a keeper key (not shown) in the keeper key slot 59.

Each of the threaded studs 18, 28, 38, 48 and 58 of the different shanks is the same, extend a like amount into the shank, and projects a like amount from the face thereof.

The interchangeable tool head members 60, 70 and 80 shown in FIGS. 6–8, respectively, include spacer bars 62, 72 and 82, with transverse end wall faces 64, 74 and 84 in which is provided threaded bores 66, 76 and 86, enlarged at the outer end for the pilot projections on the shanks as at 68, 78 and 88, and with twin insert cartridges or noses 90, at their terminal ends.

The spacer bars 62, 72 and 82 of the interchangeable tool head members are shown as having different lengths and diameters but in each instance the threaded bore 66, 76 and 86 are the same and extend a like amount into each spacer bar. Consequently, any one of the tool head members may be attached to any one of the adapter shanks 10, 20, 30, 40 or 50 by interengagement of the threaded studs in the receptive bore holes or apertures in the ends of the spacer bars.

In general, the spacer bars for the tool head members intended for completely interchangeable use with a set of adapter shanks are each of a cross-sectional area comparable to the smallest end wall face in the set of adapter shanks. In other words, of those shown, the shanks 40 and 50 would be controlling in determining the best diameter for spacer bars for the most interchangeable tooling.

This is not to say that the end wall face of the spacer bars cannot be larger than that of the smallest shank in a set but that in so doing there will be a smaller end wall facial engagement between the two, and different stress and loading as compared to use with other shanks. Since the threaded studs and apertures must be the same for interchangeability in the tooling, the smallest shank in a set is best used to determine the most suitable sized threaded stud and aperture in the shanks and spacer bars for the greatest holding strength and least reduction in material wall thickness.

FIG. 10 shows an assembled tool 100 which includes the adapter shank 10 and an interchangeable cutting tool member 102. The threaded male stud 18 is bottomed in a threaded bore 104 extending through the pilot projection 16 centrally of the end wall face 14 of the shank so that it is held in the shank, but can be replaced if it should be damaged, and is received in the receptive aperture or bore 106 in the spacer bar 108 of the tool head member.

The spacer bar includes spanner wrench holes 110 and 112, shown in FIG. 12, by means of which it may be turned down on the adapter shank and may be locked thereto with the threaded stud in tension and the end wall faces of the shank and spacer bar in load bearing compressive engagement.

The threads of the stud and aperture are turned to resist the cutting thrust of the tool and the respective end wall faces of the shank and spacer bar are formed to assure compressive loading radially inward from the outer periphery of the spacer bars by having at least one thereof provided with a slight concavity.

The threaded fastener means thus serves as an endostructural form of interengagement between the shanks and tool head members in that it is totally within the two members and provides a near integral construction closely similar both in appearance and use to one piece tooling. The threaded stud carries a tensioning load but is free of any transverse loading in that the butting end wall faces of the shank and spacer bar provide a load bearing shouldered engagement protective of the studs.

The juncture of the shanks and adapter bars will be appreciated as being as close to the gauge line of the shanks as is possible, allowing for tool clearance, code and selector rings, etc., and that the end wall shouldered engagement under compressive loading, provides the broadest and greatest possible deterrent to vibrational problems and the like normally present in multiple piece tooling.

A further factor in assuring greater tool rigidity is in the use of twin insert holders or noses on the spacer bars.

As is shown in the tool holders of FIGS. 6–8, and best described with reference to FIGS. 9, 10 and 14–17, a pair of insert holders or cartridges 114 are provided on the end of each spacer bar within a dovetail slot 116 which extends transversely thereacross. They are essentially identical, and hence are referred to as twins, and they are radially adjustable, so that they counterbalance each other in the rotary drive of the tool or in use with work turned relative thereto.

The particular cutting insert holders or cartridges shown are cylindrical in shape, undercut on the face side as at 117, and with a dovetail base 118 for engagement in the dovetail slots in the spacer bars. One side of the upper end is relieved and formed to receive an anvil 120, cutter insert 122, chipbreaker 124, and a clamp 126, held by a screw 128, in the conventionally known manner.

The cartridge members shown include a flat 130 on their backsides, best shown in FIG. 15, so that they complement each other in their most radially inwardly disposed positions and they have an adjustment screw 132 provided through their base which reacts against a shoulder stop 134 disposed centrally within the dovetail slot of each spacer bar.

As best shown in FIG. 18, the adjustment screws 132 acting against the common reference member, provided by the shoulder stop 134, enables the cartridge members to be adjusted like or different amounts in the dovetail slots for dual use, following use, or merely counterbalanced use of only one thereof, as desired. For double duty tooling a common adjustment screw, with oppositely turning threads, and fixed centrally in the slot, will be appreciated as capable of providing for dual adjustment of the twin heads, although this has not been specifically shown.

The cutting insert holders or cartridges 114 are limited in the amount of radial adjustment afforded by stop pins 135 in elongated slots in the gibs or guide rails and are held in their adjusted positions in the dovetail slots of a spacer bar by clamps 136, best shown in FIG. 12, near opposite ends of the slot and an opposite sides thereof. The (upper) ends 138 of the clamps are formed to include part of the guideway or gib of the dovetail slot and their lower ends include a fulcrum 140 by means of which a leverage advantage is obtained in the slot when they are tightened by screws 142.

When a spacer bar of aluminum or other light metal is used as shown in FIGS. 10–12, the guideways or gibs for the spacer bars are separate members, as 144, held by cap screws 146 to the top of the spacer bars, and are of steel, as are the insert holder clamps. A fulcrum seat 148 and pilot ring bushing 150 (FIG. 10) of hard tool steel are also recommended.

In practice, it will be appreciated that the twin tool heads in the innermost radial positions butt against each other and extend beyond the periphery of the spacer bars for the smallest cutting diameter that such a combination provides. As balanced one against the other and used in combination, they are each adjusted a like amount radially outward for the size cut desired. However, they may be used to rough and finish cut, lead and follow, or otherwise, as desired, with a counterbalancing effect merely in their relative relationship which enables faster cutting rates and less eccentric or other adverse loading at the assembly joint with selected adapter shanks.

In FIG. 18 a different set of tool head cartridges 154 are shown on a spacer bar 156. They are radially adjustable on the spacer bars in a like dovetail slotted arrangement to that previously described but they include cutter insert holding members 158 which are disposed at an angle in the cartridges and are adjustable axially so that the cutting inserts 160 may have their cutting edges aligned across the tool, as on reference line 162, as well as for a given diameter cut, and enable a balanced boring cut at twice the normal feed rate and for consequently twice as much stock removal.

The significance of this advantage can best be appreciated in the fact that two boring bars are presently required to provide a true bore and must be angularly disposed relative to each other for counterbalancing effect as they are fed into the work material. With the twin-set tooling disclosed only one tool is used, the feed rate is straight into the work and there are no restrictions as to the depth of cut possible because of tool mounting restrictions.

With large bores, it is conceivable that four or more cutting insert cartridges might be used on a common spacer bar to provide an even greater rate of stock removal with the same assurance of a balanced facial and/or side wall boring cut.

It will also be appreciated that while the twin-set heads are shown with the interchangeable shank tooling system they may also be provided on a conventional shank and spacer bar arrangement. They are particularly well suited for use in the system disclosed in that they assure against any eccentric loading at the juncture of the shanks and spacer bars and as regards the internal fastening means therebetween. However, their advantages as a separate tooling feature should not be overlooked.

While preferred embodiments have been described above in detail, it will be understood that numerous modifications might be resorted to without departing from the scope of the invention as defined in the following claims.

What is claimed is:
1. A tooling system comprising:
a set of tool holding shanks each for use with a different make of machine and each having a substantially transverse planar end wall face,
a plurality of cutting tools including like spaced bars and each having a substantially transverse planar end wall face,
and like axially aligned interengaging cylindrical pilot means in the respective shanks and spacer bars, and interengaging axially operative tensioning means common to said shanks and spacer bars and centrally of their end wall faces, for providing substantially full-faced preloaded and vibration resistant end wall engagement therebetween.

2. The tooling system of claim 1,
said last mentioned means including a threaded stud provided on one of said shanks and spacer bars, received in the other thereof, and under tensile stress in the interengagement provided therebetween.

3. The tooling system of claim 2,
said pilot means including a projection concentrically disposed on the end wall faces of said shanks and complementary bores provided in the end wall faces of said spacer bars,
said threaded stud being retained in said shanks, and said pilot projections terminating short of the end walls of said bores for butting end wall shouldered engagement between said shanks and spacer bars and axial tensioning of said stud in the retained interengagement thereof.

4. The tooling system of claim 3,
the end wall faces of said shanks and spacer bars being formed for peripheral and radially inward compressive loading in the retained interengagement thereof.

5. The tooling system of claim 2,
the end wall faces of said spacer bars having a cross-sectional area comparable to the smallest end wall facial area of said shanks for providing like facial engagement with each of said shanks and being formed for compressive loading radially inward from the outermost peripheral edge thereof.

6. The tooling system of claim 1,
said spacer bars including a radially adjustable tool head and means for compensating for rotational imbalance in the use thereof and to minimize eccentric loading in the connection of said spacer bars and shanks.

7. The tooling system of claim 6,
said compensating means including a second radially adjustable tool head disposed diametrically opposite said first mentioned tool head.

8. The tooling system of claim 7,
said radially adjustable tool heads being substantially similar and provided within common guide means transversely of said spacer bars.

References Cited

UNITED STATES PATENTS

| | | | |
|---|---|---|---|
| 1,647,835 | 11/1927 | Ludwick | 77—58 |
| 2,371,089 | 3/1945 | Weddel | 90—11 |
| 3,138,997 | 6/1964 | Bruckner | 90—11 |
| 3,269,271 | 8/1966 | Bruckner | 90—11 |
| 3,339,458 | 9/1967 | Williams | 90—11 |

FOREIGN PATENTS

| | | |
|---|---|---|
| 651,513 | 1/1964 | Belgium. |
| 927,223 | 5/1963 | Great Britain. |
| 935,081 | 8/1963 | Great Britain. |

OTHER REFERENCES

Publication: American Machinist, vol. 66, No. 13, Mar. 31, 1927 (517–521).

GERALD A. DOST, Primary Examiner

U.S. Cl. X.R.

77—71